Nov. 14, 1939.  W. W. HARTMAN  2,179,659
MULTIPLE BAND BLADE SLICING MACHINE
Filed May 14, 1938  7 Sheets-Sheet 1

Inventor
William Walter Hartman.

Attorney.

Nov. 14, 1939.   W. W. HARTMAN   2,179,659
MULTIPLE BAND BLADE SLICING MACHINE
Filed May 14, 1938   7 Sheets-Sheet 2
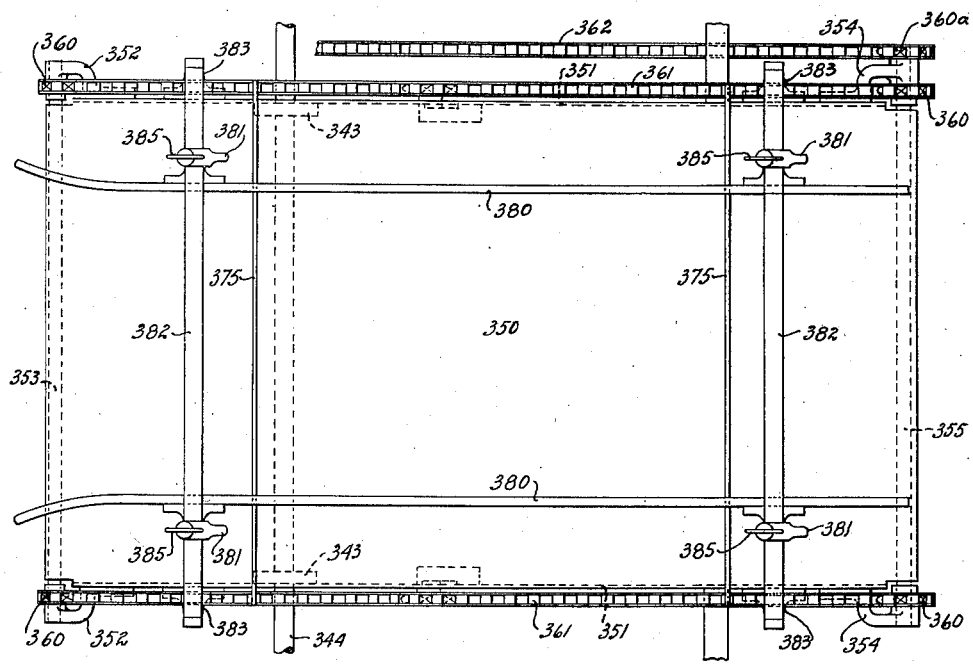
Fig. 12.
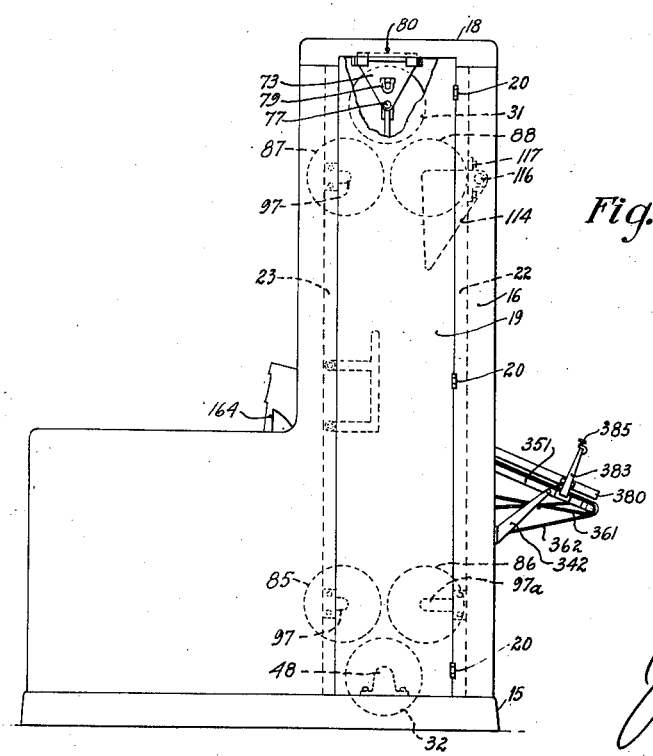
Fig. 1a.
Inventor.
William Walter Hartman.
Attorney.

Inventor.
William Walter Hartman.
Attorney.

Nov. 14, 1939.  W. W. HARTMAN  2,179,659
MULTIPLE BAND BLADE SLICING MACHINE
Filed May 14, 1938   7 Sheets-Sheet 4

Inventor.
William Walter Hartman.

Attorney.

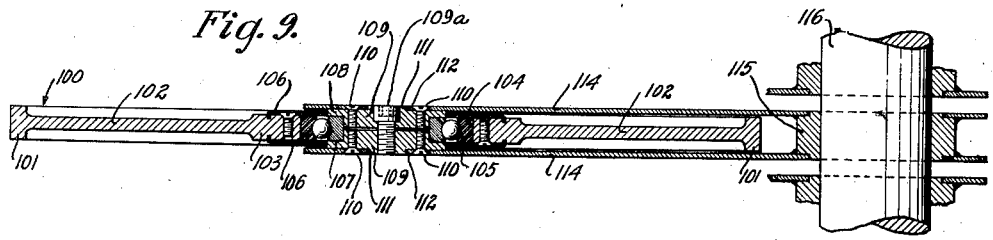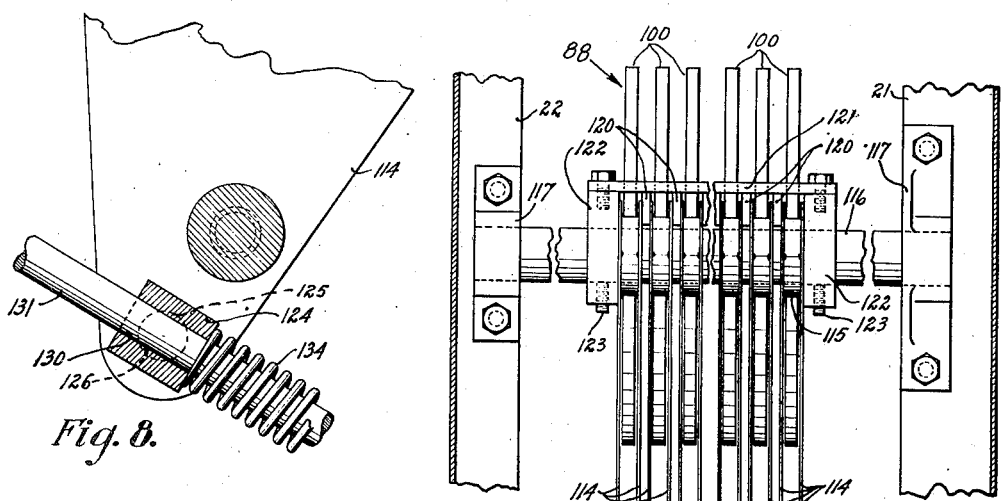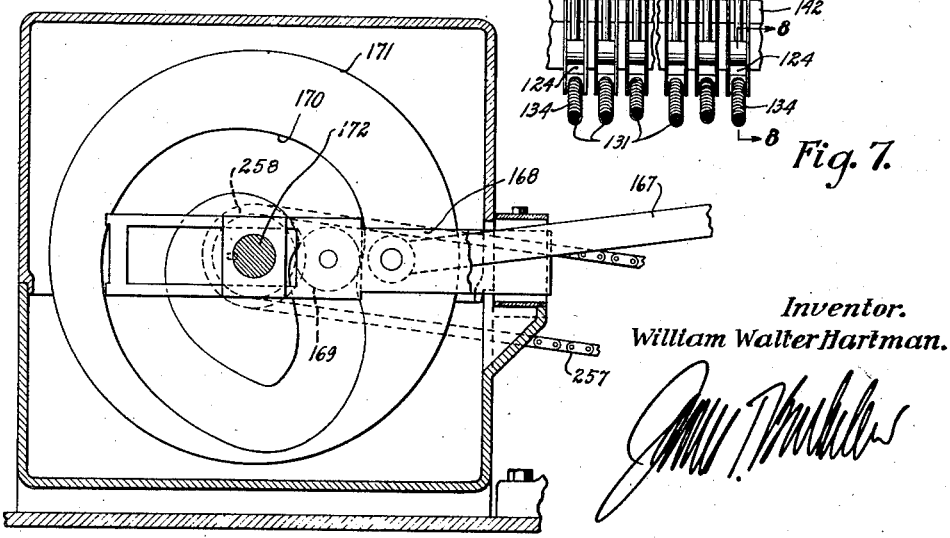

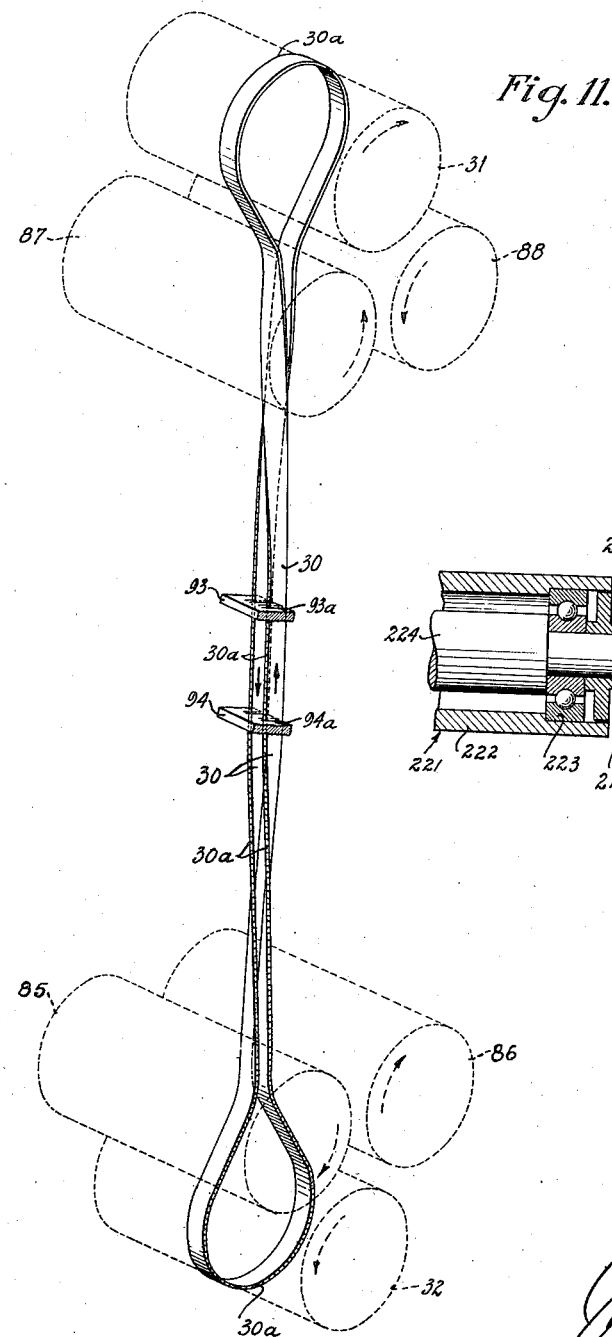
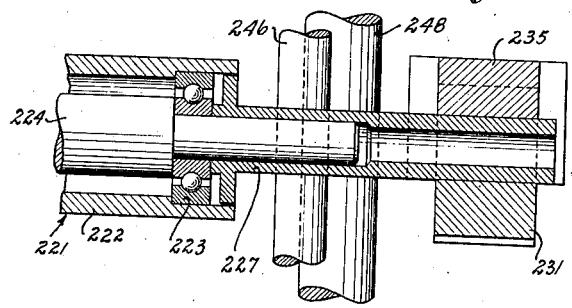

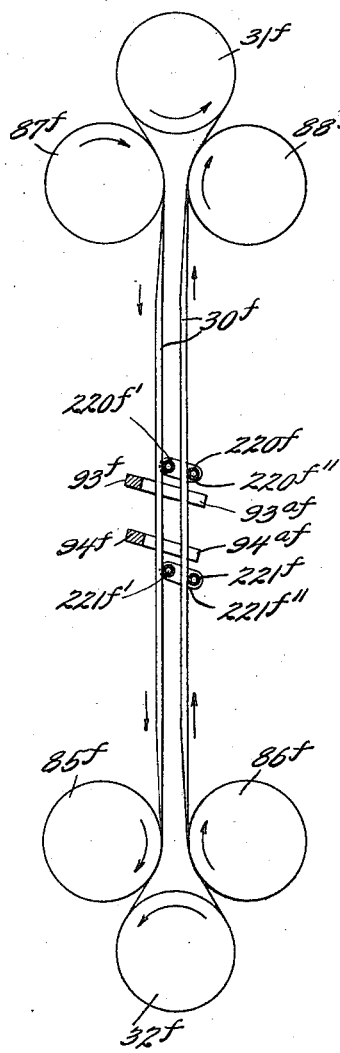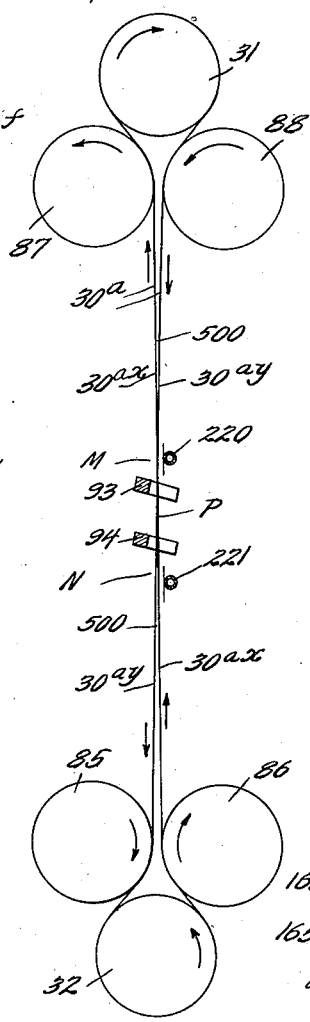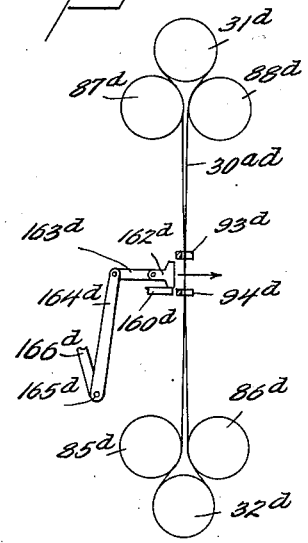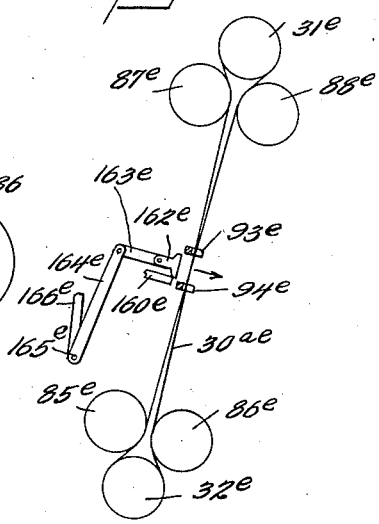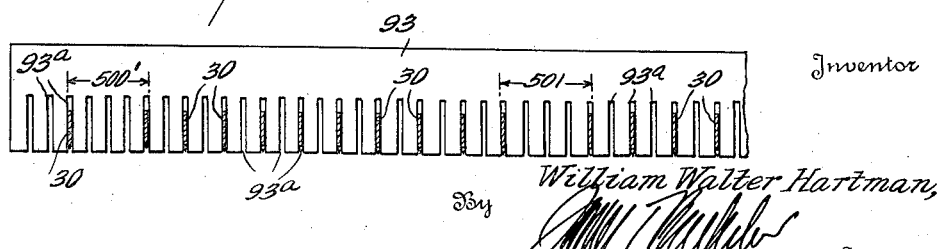

Patented Nov. 14, 1939

2,179,659

UNITED STATES PATENT OFFICE 2,179,659

MULTIPLE BAND BLADE SLICING MACHINE

William Walter Hartman, Los Angeles, Calif.

Application May 14, 1938, Serial No. 207,931

20 Claims. (Cl. 146—88)

This invention relates generally to machines for slicing loaves of bread, or other articles, and deals more particularly with multiple endless band blade slicing machines.

In large scale slicing operations, endless band blade slicers have many points of superiority over the older reciprocating blade machines. Reciprocating blades do not cut perfectly clean slices because they stop and reverse direction at the end of each stroke even though the loaf or other article advances continuously therethrough. Furthermore, reciprocating knives are necessarily comparatively short, as well as greatly restricted in speed of travel, as compared with endless band blades, and therefore require more frequent re-sharpening. In contra-distinction, the blades of a band blade machine are comparatively long, usually many times the length of a reciprocating blade, and further, a continuous or endless band blade may be driven with a velocity many times the practical maximum velocity of a reciprocating blade. At the same time, endless band blade machines entirely overcome the many defects arising from the stopping of reciprocating blades at the ends of each stroke.

The band blade machine, however, while having theoretical capabilities far beyond those of reciprocating blade machines, presents certain problems and difficulties which must be overcome before those capabilities can be effectively realized. Because of the elimination of reciprocating mechanism, a comparatively high linear band-blade-velocity, say approximately from one to several thousand feet per minute, is feasible. At high speeds howevers, two problems arise: first, to so arrange the blades in the slicing zone that the loaves or other articles will not be deformed by the blades during slicing, and second, to eliminate sharp blade twisting as this is a cause of blade breaks. These difficulties are present even at low band blade velocities, but the difficulties are aggravated as the blade velocity is increased.

Accordingly, it is a general object of this invention to bring about a multiple endless band slicing machine of the type in which all the blade courses cooperate in the slicing action, and in which the foregoing defects or difficulties are minimized or eliminated, and which has certain further advantages and benefits as will be hereinafter described.

More specifically, it is an object of this invention to arrange the blades in the slicing zone to reduce or eliminate the deformation or crushing of soft articles, such as loaves of bread, by the blades during slicing.

It is a further object of this invention to reduce to a minimum the degree of positive twisting of the blades by the blade twisting means, in order to increase the life of the blades and of the blade twisting means.

It is a further object or benefit of this invention, when the efficient reciprocating ram type feeder is used therewith, to permit shortening the ram stroke needed to feed the articles completely through the blades, and to thus increase the slicing capacity of the machine without increasing the actual rate of feed through the blades.

It is a further object of this invention to provide novel blade back-up means that gradually and automatically moves back and forth transversely of the blades, to thereby greatly prolong the life of such blade back-up means, and to provide certain other benefits.

It is a further object of this invention to so mount the article hold-down means, and the upper blade twisting guide means, that these members are adjustable in unison upwardly and downwardly, and that they remain in accurate parallel transverse relation in all their adjusted positions, this being accomplished by a plurality of upright screws spaced apart from each other transversely, and operated by a common turning member.

It is a further object of this invention to provide novel spacing means between the individual blade tensioning assemblies to facilitate adjustment of the machine to cut various slice thicknesses.

It is a further object of this invention to provide novel individual blade tensioning assemblies, that can be very quickly and conveniently connected or disconnected, to tension or detension a blade, or blades, as desired.

It is a further object of this invention to provide outfeed conveyor mechanism, which, owing to the inherent tallness of endless band slicers, slopes downward with such steepness that the sliced articles if unrestrained would slide down in confusion along same, but which because of my combining slightly resilient transversely adjustable side rails, with propelling slats travelling in timed sequence along the conveyor, restrains the sliced articles by moderate braking action upon them, thus retarding them against their falling tendency, to thereby deliver the sliced articles in orderly manner and at regular timed intervals controlled by the travelling slats, notwithstanding the step inclination of such outfeed conveyor.

It is a further object of this invention to provide a novel arrangement which permits easy installation of the endless band blades with minimum separation or disconnection of parts.

It is a further object of the invention to provide surplus slots in the blade twisting guide means so that one or more of the blade courses can be separated from the others by a gap or space of greater width than the normal uniform space between the successive cutting courses of the blades.

Other objects, benefits and features of my invention will become apparent through inspection of the drawings, through consideration of the following detailed description, and from the claims.

While my invention can take various forms and embodiments, and is subject to extensive modifications, I believe it can be best understood by referring to the following detailed description of a present preferred embodiment thereof, reference being made to the accompanying drawings in which:

Fig. 1a is a side elevation of the machine, with parts broken away;

Fig. 7 is a view taken as indicated by arrows 7—7 in Fig. 1;

Fig. 8 is a detail section taken on line 8—8 of Fig 7;

Fig. 9 is a detail section taken on line 9—9 of Fig. 1;

Fig. 10 is a vertical cross section of the machine through the main drive shaft;

Fig. 11 is a somewhat exaggerated perspective view of a single band blade showing the manner of threading and twisting of the blades in the machine;

Fig. 12 is a view taken as indicated by arrows 12—12 of Fig 1;

Fig. 13 is a detail section on line 13—13 of Fig 5;

Figs 14, 15, 16 and 17 are diagrammatic views, looking in a direction parallel to the axes of the blade supporting drums. Essential parts alone are indicated, and details are omitted from these views in the interest of clearness. Also, in Figs. 14, 15 and 17, only the cutting edge of the blade is indicated as a further aid to clearness.

Fig. 14 is a diagrammatic view of a slightly modified embodiment of my invention indicating a feeder ram mounted to reciprocate approximately horizontally for feeding articles to the blades at approximately right angles, as indicated by the arrow.

Fig 15 is a diagrammatic view similar to Fig. 14, but the path of the ram reciprocation and article feet is inclined downwardly in the direction indicated by the arrow. The drums are mounted to present the blades at right angles to the inclined path of the reciprocating ram feeder.

Fig. 16 is a diagrammatic view indicating the blades threaded on and about the drums in a manner different from that indicated in the other views, as will hereinafter be more fully described.

Figure 1:
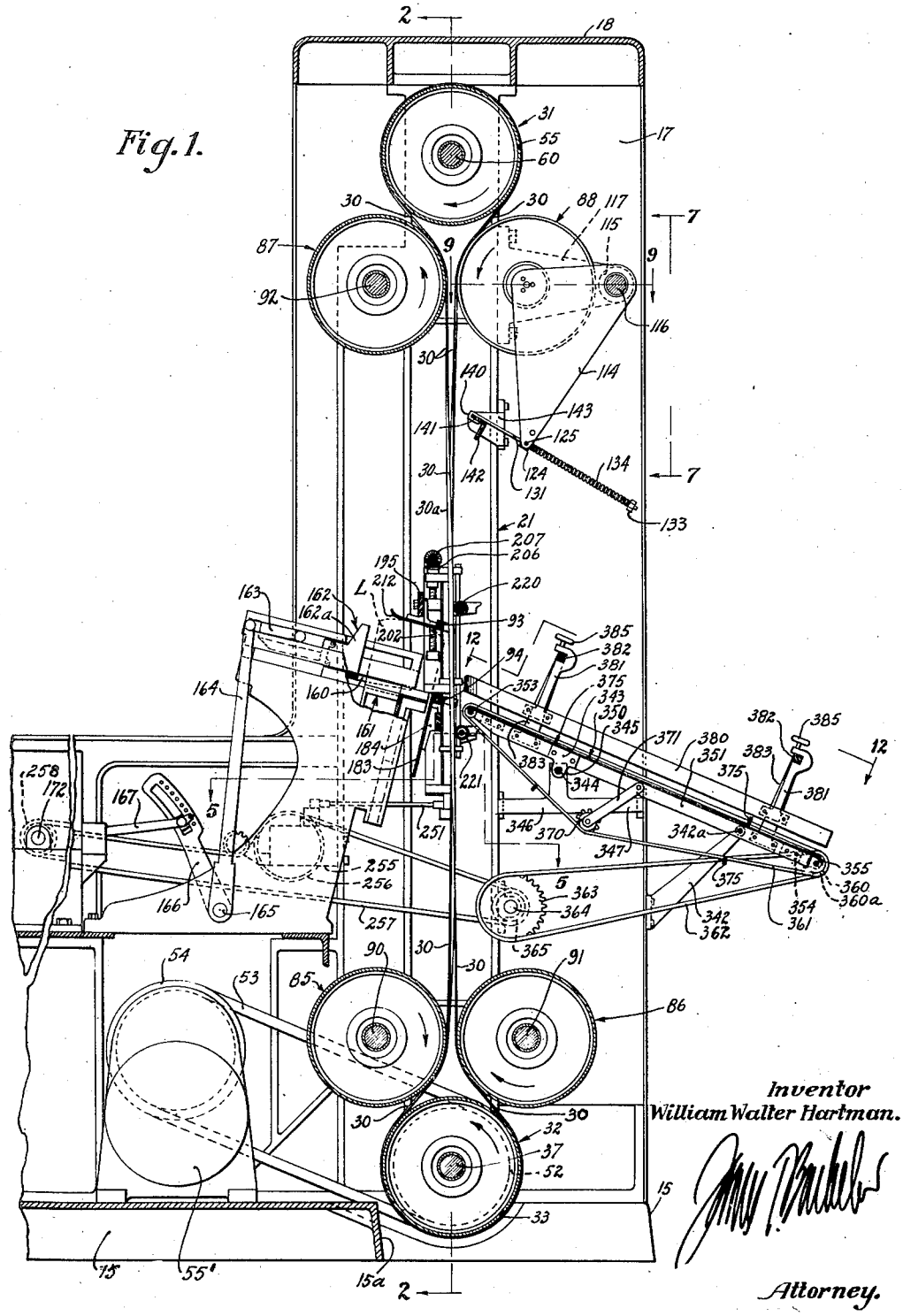
Fig. 1 is a vertical longitudinal section of a typical slicing machine built in accordance with the present invention, the infeed mechanism being shown principally in elevation, the view, except for the infeed mechanism, being taken as indicated on line 1—1 of Fig. 2.

Fig. 17 is a diagrammatic view of my blade mounting illustrated in Fig 1.

Fig. 18 is a diagrammatic illustration of a modified distribution of the blade courses in the slots of the blade twisting means to provide one or more large irregular gaps between the blade courses, as will be hereinafter more fully described.

Figure 2:
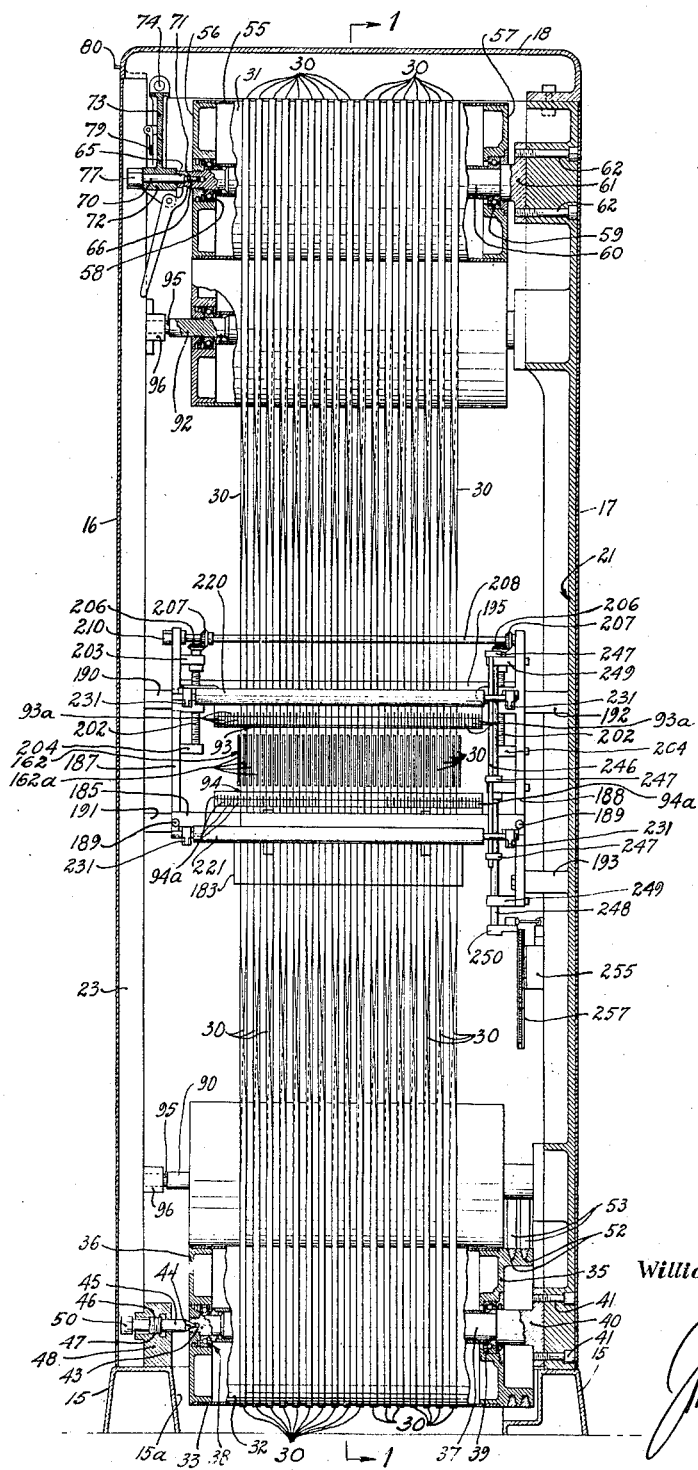
Fig. 2 is a vertical section taken on line 2—2 of Fig. 1, the upper and lower band blade drums, together with the blades, being shown principally in elevation.

In Figs. 14, 15 and 16, like parts are designated by the same reference numerals applied to them in Figs. 1 and 2, but the letters "d", "e", and "f" are respectively added to distinguish them from those used in the earlier figures.

The general frame structure of the machine includes base 15, and mounted on this base is a frame comprising front and rear sides 16 and 17 and a top 18. Front frame side 16 is provided with a swinging door 19 hinged as at 20. A frame casting 21 extends vertically from base 15 to top 18 adjacent the inner surface of frame side 17, and supports the mechanism as hereinafter to be explained. A pair of vertical bars 22 and 23 extend from base 15 to top 18 adjacent the inner surface of side 16, and also serve to support the slicing mechanism.

A plurality or series of endless band blades 30 are looped over the upper and lower blade supporting drums 31 and 32, respectively, which as here illustrated are preferably of the same diameter and preferably have their axes substantially parallel and in the same vertical plane. The blades preferably go on drums 31 and 32 in the manner indicated in Fig. 11, the band loop being passed first over upper drum 31, then being twisted through a half turn, and finally passed over lower drum 32. This threading arrangement brings the cutting edges 30a of the central portions of both courses of the band blade to a position directed toward the front end of the machine, from which direction the loaves or other articles are fed against the blades.

Lower drum 32 is mounted as low in the machine as possible. For this purpose, base member 15 is formed with an opening 15a adapted to receive the lower portion of the drum, as indicated in Fig. 2. This drum 32 comprises a cylindrical shell 33 mounted on ends 35 and 36 which are in turn mounted for rotation on a non-rotatable shaft 37 as indicated for instance at 38 and 39 in Fig. 2. The rearward end of said shaft 37 is provided with a flange 40 by which it is secured to mounting casting 21, as by means of screws 41. The entire weight of the drum may thus be supported at this one end of shaft 37. A removable support is provided for the other end of the shaft. Thus, said other end of shaft 37 is formed with a conical recess 43 adapted to receive the pointed end 44 of a centering shaft 45, said shaft 45 being externally screw threaded at 46 and being screwed within the internally screw threaded bore 47 of a supporting member 48 mounted on the base portion 15 of the frame. The outer end of shaft 45 has a hexagonal head 50 by which said shaft may be turned to screw the shaft into and out of engagement with drum shaft 37, thus making members 37 nd 45 separable from each other for purposes hereinafter mentioned. This shaft 45 serves to steady the drum shaft during operation of the machine. When a new blade is to be threaded around drum 32, shaft 45 is backed away from shaft 37, so that the endless blade can be moved down between its pointed end and the end of the drum and then moved on over the drum. The inner end of the drum 32 is formed with a pair of peripheral V-grooves 52 for a driving belt 53 driven by a pulley 54, the latter being driven through suitable reduction gears, not shown, from the shaft of an electric motor 55' mounted on base 15.

Upper drum 31 consists of a cylindrical shell 55 mounted on drum ends 56 and 57, which are in turn rotatably mounted by means of bearings 58 and 59 on a non-rotatable shaft 60, the inner end of the latter having a flange 61 secured as by screws 62 to frame casting 21, as clearly indicated in Fig. 2. The outer end of shaft 60 is drilled with an axial bore 65 and with a reduced axial bore 66, the latter being internally screw threaded. A shaft 70 of a diameter such as to be received within bore 65 and having a reduced screw threaded end 71 adapted to be screw threaded within bore 66 is rotatably mounted in a bearing 72 carried by the lower end of a hanger 73 pivotally mounted on a horizontal pin 74 which is supported at right angles to shaft 70 on a flange integral with the top 18 of the frame. The outer end of shaft 70 has a hexagonal head 77 by means of which said shaft may be screwed into or backed out of engagement with the screw threaded socket in the end of shaft 60, thus making members 60 and 70 separable from each other. When it is desired to place a new blade in the machine, the side door of the machine is swung open, and this shaft 70 is then backed out of engagement with shaft 60, after which hanger 73 is swung outwardly and upwardly and is temporarily secured in an upper inoperative position by engaging a loop 79 carried by the hanger over a pin 80 mounted on frame top 18 above the side door. When shaft or member 70 is thus separated from shaft 60 of the upper drum 31, and member 45 is separated from shaft 37 of the lower drum 32, an endless band blade may readily be passed between these drums and the frame of the machine into normal operating position on said drums 31 and 32.

Mounted at an elevation above that of lower drum 32, and preferably one on either side of the plane passing through the axes of upper and lower drums 31 and 32, are a pair of rotatable blade deflecting idler or guide drums 85 and 86, the drums 32, 85 and 86, in the form of the invention here shown, lying quite close to one another, as illustrated in the drawings. Similarly, there is mounted at an elevation below that of upper drum 31, and preferably one on either side of the plane passing through the axes of drums 31 and 32, a pair of rotatable blade deflecting drums 87 and 88, the drums 31, 87 and 88 likewise lying quite close to one another.

To provide automatic tensioning of blades 30, either of the drums 31, 32, 85, 86, 87 or 88, could be segmented into a plurality of individual blade deflecting guide drums, one for each blade 30; but I consider it an improvement to select one of the blade deflecting guide drums 85, 86, 87 or 88, to be segmented for this purpose, as the arc of blade contact on these drums is slight compared with the large arc of blade contact, exceeding 180°, around the blade supporting drums 31 and 32. If the latter were segmented, each of its individual drums would be supported by its own side arms or brackets embracing both sides of the individual drums, and consequently it would be difficult or bothersome to install a blade thereon as such side arms or brackets would interfere. This interference, however, is entirely eliminated when one of the blade deflecting guide drums 85, 86, 87 or 88 is selected for segmentation, because the blade contacts these drums in such manner that there is no difficulty in installing the blade notwithstanding the side arms, plates or members, that support each such drum on both sides. In the preferred embodiment of my invention I have selected blade deflecting drum 88 to be segmented. The drawings show this drum 88 made up of a series of individual blade tensioning drums 100, as will later be described in more detail, but as far as the blade deflecting function is concerned, the segmented drum 88 may for many purposes be broadly considered as a single drum like 31, 32, 85, 86 and 87, only its individual members 100 participate both in the blade deflecting and in the blade tensioning functions. As shown in the drawings, drums 85, 86, 87 and 88 engage all the courses of the band blades between upper and lower drums 31 and 32 and deflect said courses substantially over toward the plane that passes approximately midway between upper drums 87 and 88, and lower drums 85 and 86, this plane, in the preferred embodiment also passing approximately through the substantially parallel axes of drums 31 and 32.

Along the blade courses between the drums, I provide spaced apart blade twisting guide means, which can take various forms, one form being illustrated by the parallel bars or plates 93 and 94, see Figs. 1, 2 and 11. These bars are spaced apart to form in between them a slicing zone for the blades, and through this slicing zone the loaves or other articles to be sliced are fed. In this slicing zone the blades run in spaced parallel slicing planes, having been twisted into such planes by the said blade twisting means, as will be presently described. These bars 93 and 94, supported as described later, are provided with rows of alined blade twisting guide slots 93a and 94a, respectively, adapted to receive the individual courses of the band blades and space them apart according to the slice thickness required. As will appear from Figs. 1, 2, 3 and 11, the downwardly and upwardly traveling courses of each band blade are received in adjacent guide slots of these blade twisting guide bars 93 and 94, in such a manner that each blade course makes a 90° twist between each guide bar and the drum from which, or onto which, that blade course is travelling. Attention is directed to the fact that the blade courses are received in alternate blade receiving slots of bars 93 and 94, the intervening slots being unoccupied. This provision enables the blade courses at the two extreme ends of the loaf to be moved outwardly a distance equal to a half slice thickness to the next blade slot, so as to avoid cutting the first or "crust" slice too thin. It will be readily understood that at the time the machine is set up for a loaf of given length, an inspection may be made to determine if the end or "crust" slice will be thinner than desirable, and if so, the blade courses taking such cuts are moved outwardly to the next blade slots, so as then to clear the ends of the loaf. It will also be noted in Fig. 2, that the blade twisting bars or plates 93 and 94 may be transversely extended substantially beyond both ends of the battery of blades 30, and in these extensions the blade twisting guide slots 93a and 94a may be continued, so that there is a larger total number of such slots in each of the bars or plates 93 and 94 than there are blade courses to be twisted. Such surplus guide slots are useful in various ways, including the control of the end crust slice as already mentioned. Also, if there is a surplus of blades on the machine, and it is for any reason desired to do so, such surplus blades can be separated from the others by moving them over into the surplus slots at the ends of plates 93 and 94. Or it may occasionally be desired to extend side supporting rails through and between the blades, in which case large irregular gaps between the courses can be produced for this purpose by use of the surplus slots. It will be understood that usually the spaces between the blade courses will all be equal and uniform, to produce slices of equal thickness. But as previously indicated a larger space or gap between some of the blade courses is sometimes desired, and this is illustrated at 500', in Fig. 18, where the extreme end blade course is shown spaced apart irregularly from the other blade courses to take care of the end crust slice as previously described. At the opposite end of the battery of blades in Fig. 18, another large irregular gap or space 501 is illustrated as setting off several blade courses from the others, for any purpose desired. In Fig. 2, all the drums are shown sufficiently extended to accommodate such arrangements of the blades.

Between guide bars 93 and 94, the blade courses are disposed in spaced parallel slicing planes, and their cutting edges preferably are all nearly or substantially parallel, and approximately in a common plane extending transversely of the machine, i. e., approximately parallel to the axes of the blade suporting drums 31 and 32, so that a loaf moving against said cutting edges of the blades between the guide bars is attached substantially simultaneously by all the blade courses, both upwardly and downwardly travelling.

The distance between the guide bars 93 and 94 and the drums 87, 88 and 85, 86, is sufficient that the necessary 90° twists in the blade courses between those points is comparatively gradual, so that twisting strains on the blades such as are apt to promote blade breakage are eliminated. Conversely, pressure of the blades on the guide bars 93 and 94 is reduced, and wear of those members is also reduced.

In Fig. 11 there is illustrated a band arrangement in which the band blade is looped over the upper drum with the sharp or cutting edge 30a of the blade pointing in one direction; the blade is then given a 180° twist between the upper and lower drums, and is looped over the lower drum with the cutting edge 30a pointing in the opposite direction. Consequently each of the two courses of each blade crosses from one side of one of the blade supporting drums to the opposite side of the other of the blade supporting drums about which the blade is mounted. This arrangement is preferred because it gives to each blade course a natural twist that brings the central portion of the course close to the desired cutting position without aid of the blade twisting guide means, and also because it brings the two courses of each blade naturally together at the place where they cross or intersect centrally of the drums, as viewed in Fig. 1.

I now wish to point out more specifically, the advantages of my six drum crossed blade slicer, illustrated in Figs. 1, 11 and 17 of this application, as compared with my four drum crossed blade slicer shown in Figs. 12 and 17 of my copending application, Serial No. 112,539, filed Nov. 24, 1936, now matured into Patent No. 2,143,342. My four drum slicer could be said to result from my six drum slicer, if drums 85 and 87, see Fig. 17 of this application, were omitted, and if drums 86 and 88 were set somewhat to the left. The upwardly moving blade course would then span between drums 86 and 31 (drum 87 being assumed omitted), and consequently the place where its natural twist points it at right angles to the axes of drums 31 and 32, would be exactly midway of drums 86 and 31, this in practice being usually above the upper blade twisting guide means 93, or approximately at M, in Fig. 17. Correspondingly the downwardly moving blade course spans between drums 88 and 32 (drum 85 being assumed omitted), and consequently the place where its natural twist points it at right angles to the axes of drums 31 and 32, is also midway between drums 88 and 32, or approximately at N, in Fig. 17. In other words, these corresponding points M and N, in the two courses of the same blade, are not at the same elevation, one being usually above and the other below the blade twisting guide means 93 and 94. Therefore, since both these blade twisting means operate on each course of the blade, and since their twisting action is more severe in proportion as they contact and twist the blade further from the place where its natural twist points it in the desired right angular direction, it follows that the twisting action of members 93 and 94 is more severe in my aforesaid four drum slicer than in the improved six drum slicer disclosed in this application. In the latter the natural twist of both blade courses points the courses in the desired direction at an elevation exactly midway between upper drums 87 and 88 and lower drums 85 and 86, to wit at P, in Fig. 17, this being at the same place in both courses of each blade, and by locating the blade twisting means 93 and 94 approximately equally from this place P, the slight further twist needed from blade twisting means 93 and 94, to bring the blades into the parallel slicing planes, is substantially less than in my earlier four drum slicer. Consequently, gentler treatment and longer life is procured for the bades in my six drum slicer. Anything that lengthens the lives of these endless band blades is of course exceptionally helpful, because breakage of a single blade may tangle and break many of the others.

It will be evident that the closer drums 85 and 86, and also drums 87 and 88, are to one another, the more nearly will the individual blade courses all approach the plane that passes approximately midway between these drums. Since it is most desirable, as has been pointed out, that all courses of the blades approach parallelism as nearly as possible, in practice drums 85 and 86 and also drums 87 and 88 are preferably placed as close to one another as is consistent with certain other factors which must be taken into consideration, one of which is of course that the blade courses 30ax and 30ay (Fig. 17) running in opposite directions over adjacent drums 87 and 88, or 85 and 86, must not interfere with one another by reason of their twist or flare as they approach or recede from these drums. In Fig. 1 of the drawings, the separation between drums 85 and 86 and between drums 87 and 88 are shown at a reasonable distance to do justice to all factors, and to bring the blade courses in the slicing zone sufficiently close to parallelism that all "pinching" or deformation of the loaves or articles by the crossed blades is avoided. It will of course be evident that any spacing distance is suitable which will bring the blade courses to a sufficient approximation of actual or rough parallelism as will avoid or reduce the kind of pinching or deforming of the loaf that occurs when the cutting edges of the two courses of each blade cross and make an angle of divergence between them substantially exceeding ten degrees, viewed in a direction parallel to the axes of the blade supporting drums. In the diagrammatic Fig. 17, where for simplification only the cutting edge 30a of the blade is shown, this angle of divergence 500 is clearly indicated as being formed between the upwardly and downwardly moving blade courses 30ax and 30ay respectively, all parts in this Fig. 17 being viewed in a direction parallel to the axes of the blade supporting drums 31 and 32.

The significance of my use of the two pairs of blade guide drums 85—86 and 87—88 may be viewed in another aspect. In the well known "figure 8" type of machine, in which the blades are supported and guided exclusively by two drums over which the blades are looped, the angle of divergence between the two courses of each blade is quite large, unless the machine is made unduly tall, or the drums are made undesirably small in diameter. The present invention solves this problem by guiding both courses of each blade by means of drums engaging their outer or remote rather than their inner or adjacent surfaces. In other words, instead of relying upon the usual drums placed inside the band blade loops to position the crossing, 180°-twisted blade courses, the blade courses are positioned by running them between and against the two members of each of two pairs of guide drums, which members are capable of being, and preferably are, positioned quite close together. Thus the two blade courses of each blade are supported in crossing, 180°-twisted positions, but with a comparatively small angle of divergence between them, by the two pairs of drums 85—86 and 87—88, the two drums 31 and 32 placed inside the blade loops serving simply to hold the blades against said pairs of guide drums. The function of defining the positions assumed by the blade courses is thus delegated entirely to the pairs of drums 85—86 and 87—88, the drums 31 and 32 serving simply to guide the blades from one drum to the other of each of said pairs.

Blade deflecting guide drums 85, 86 and 87 are mounted for rotation on fixed center shafts 90, 91 and 92, respectively, and these center shafts may be substantially like the previously described shafts 37 and 60, their rearward ends being provided with mountings on frame casting 21 similar to those described for shafts 37 and 60. The forward ends of shafts 90, 91 and 92, however, are provided with reduced portions 95 supported by mountings 96 carried by bracket arms 97 and 97a secured to frame posts 22 and 23.

Drum 88, as previously mentioned, comprises a series or row of individual drums 100, the peripheries of which engage individual band blades traveling between upper drum 31 and idler drum 85. The make-up of this segmented drum 88 is shown best in Figs. 7 to 9, to which attention is now directed. Each roll 100 comprises a rim 101, whose periphery is adapted to engage an individual blade, and a web 102 and hub 103. Hub 103 is formed with an axial bore 104, within which is received the outer race ring of a ball bearing 105, said bearing being retained by a pair of circular retainer plates 106 secured to hub 103. The inner race ring of bearing 105 is mounted on outwardly facing annular shoulder 107, and between flanges 108, formed on a pair of disks 109, which are secured together and pressed against the sides of the inner race ring of bearing 105 by means of screw 109a. The outer flat faces of disks 109 are provided with trunnions 111 which are received in circular openings 112 formed in a pair of parallel, substantially triangular flat plates 114, the latter being secured to discs 109 by screws 110. Plates 114 are mounted on a hub 115 which is rotatable on a relatively stationary shaft or mounting means 116 extending transversely of the machine and having its ends held in brackets 117 secured to frame casting 21 and frame bar 22. Each drum or roll 100 is similarly supported for rotation on a pair of plates 114 mounted to swing on common shaft 116, the rolls thus being independently rotatable and arranged for independent swinging about shaft 116, by means of the lever, (in this case in bell crank form), comprising plates 114. The shaft member 116 is located to the rear of the axis of individual drums 100, and substantially at the height of the center shaft 92 of the opposed idler drum 87, and it will be evident that swinging movement of the lever or plates 114 in a right-handed direction, as viewed in Fig. 1, will bring individual rolls 100 into tensioning engagement with the individual blades passing over drum 31. In the present illustrative form of the invention, drums 100 are properly spaced from one another by spacing fingers 120 which extend from and are supported in any suitable manner by some transverse member, such for instance as horizontal bar 121, which in this instance is mounted over shaft 116 and is supported on mountings or end stops 122 securely but adjustably fastened to shaft 116 as by means of set screws 123. These spacing fingers 120 extend between plates 114 of adjacent drums, and thus determine the spacing between the individual drums 100. It will be evident that bar 121 is interchangeable with other similar bars having spacing fingers 120 of greater or less thickness, to suit different required spacings of rolls 100 for different spacings of the blades as may be required for different slice thickness requirements. Mountings 122 are of course capable of being set on shaft 116 at any position proper for bars 121 of different lengths. Also, each individual blade tensioning assembly, which may be said to comprise a drum 100, the mounting 114 therefor, and its spring 134 to be later described, all as generally illustrated in Figs. 7, 8 and 9, is movable along shaft 116 transversely of the machine to suit the drum spacing for any desired slice thickness within the range of the machine. When the machine is adjusted to suit a new slice thickness, different blade twisting guide members 93 and 94, with proper spacing of the blade slots 93a and 94a to suit the new slice thickness, are also substituted for the ones previously in place; and a different ram head 162, with ram fingers 162a spaced to suit the new slice thickness, is also substituted for the one in place.

The blades being properly positioned on upper and lower drums 31 and 32 to correspond with the spacing of rolls 100, they are then tensioned by swinging plates 114 in a right-handed direction, as viewed in Fig. 1, thereby lifting rolls 100 into engagement with the blades just below upper drum 31. The blades are then separately tensioned by the above mentioned individual blade tensioning assemblies.

To supply the necessary resilience to such assemblies I prefer to connect the drum carrying lever 114 to some transversely extending and relatively stationary reaction means, for instance bar 141, Figs. 1 and 7, such connection being effected preferably by means including a spring, arranged either in tension or compression, also a screw threaded adjustment for varying the reaction of such spring, and some sort of hook expedient, as for instance a hook proper, or an eye to hook over a pin, or the like, to thereby permit quick disconnection between the drum carrying lever and the reaction member 141 by simply manually moving the hook expedient approximately oppositely to the reaction of the spring. Facility for thus instantaneously connecting or disconnecting these parts, for quick tensioning or untensioning of one or more blades, is a very helpful and convenient feature especially when blades are being installed or removed from the machine.

In the drawings I have illustrated a preferred form of such tensioning means, described as follows. A block 124 is provided between the lower portions of each pair of lever plates 114, and this block is provided with trunnions 125 rotatably received in circular openings 126 in plates 114. Slidable through a bore 130 in block 124 is a tension rod 131. The rearward end of this rod has screw threaded thereon a tension adjustment nut 133, which engages one end of a compression spring 134 encircling rod 131 and engaging at its other end against block 124. The forward end of each tension rod 131 is formed with a hook 140 adapted to engage over the flange of an angle iron member 142 which is welded between brackets 143 secured to frame members 21 and 22.

Each blade is tensioned by hooking its corresponding tension rod 131 over the flange of a common reaction member, as for instance angle iron 142 and then, if necessary, adjusting compression spring 134 by adjustment of nut 133. Thus each band blade is individually tensioned, and even though the length of individual blades may vary somewhat, they may be brought to equal tension by proper adjustment of nuts 133.

In the event that a blade should break, the corresponding rod 131 is unhooked from flange 141, which allows the tensioning drum 100 to drop, plates 114 supporting said roll swinging counter-clockwise as viewed in Fig. 1. A new blade is then placed in the machine, after which the blades are again tensioned by first hooking rod 131 back over angle iron 142 and then suitably adjusting the nut 133 on the end of said rod.

The previously described blade tensioning assemblies, one form of which is illustrated in Figs. 7, 8 and 9, may be termed "self-actuating" assemblies, because spring 134, continually urges or actuates drum 100 to tension the blade, and of course a weight can be arranged, utilizing the force of gravity, as a substitute for spring 134, if desired.

Figure 4:
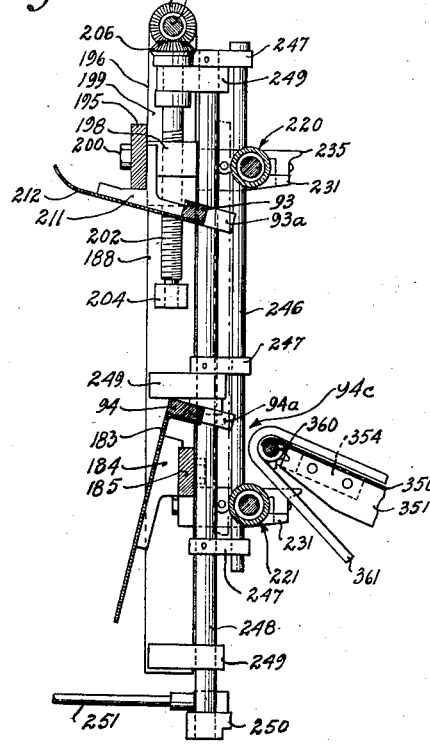
Fig. 4 is a vertical section taken as indicated by line 4—4 of Fig. 3.
Figure 3:
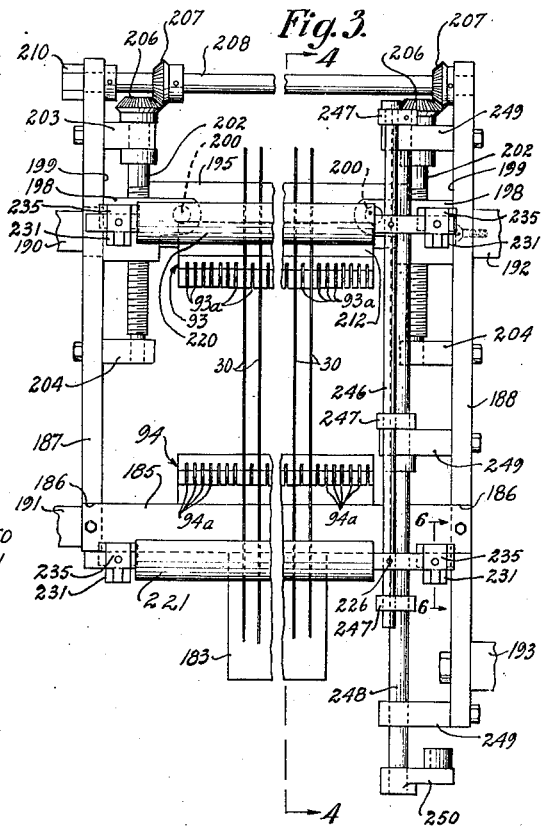
Fig. 3 is an enlarged detail taken from Fig 2.

I now wish to point out a feature of invention concerning the facility with which new endless blades may be installed on my machine. This can be best understood from Figs. 1, 2 and 4. As previously described the means for supporting each of the outer drums 31 and 32 comprises two members separable from each other, namely non-rotatable shaft 60 and member 70, for drum 31, and non-rotatable shaft 37 and member 45, for drum 32. The purpose of making these members separable, providing clearance therebetween is so that the endless band blades can be passed through this clearance from outside the machine into normal operating position in the machine on drums 31 and 32. When the blades are thus installed members 70 and 45 are again brought into engagement with the free ends of the non-rotating shafts 60 and 37, to cooperate in firmly supporting the rotatable drums 31 and 32. It is only necessary to provide such clearance for drums 31 and 32 and not for the blade deflecting guide drums 85, 86, 87 and 88. The blades do not embrace the latter in the manner that they embrace drums 31 and 32, this accounting for the difference. But the facilities thus far described for convenient installation of the blades, are not complete, because the various blades must be transported freely through and across the machine, i. e. transversely thereof so they can be inserted in their respective guiding and twisting slots 93a and 94a, in the blade twisting members 93 and 94. To facilitate this it is a feature of this invention that the slotted edges of the blade twisting members 93 and 94, are entirely free and unobstructed entirely across the machine, so that the blades can be freely moved from outside the machine, past the ends of drums 31 and 32 through the clearance described, then along a continuous open path transversely across the machine, i. e. along the unobstructed slotted edges of members 93 and 94, and thence into normal operating position in the blade engaging slots 93a and 94a in members 93 and 94. This freedom of obstruction along the slotted edges of members 93 and 94 is noted in Figs. 1 and 4, particularly the latter. It is understood that the lower of these members 94 is unadjustably fastened in fixed position on the frame structure, and its upper face cooperates in supporting articles that are being sliced. Immediately following this member 94, in the direction in which articles are fed, that is from left to right in Figs. 1 and 4, is an article support means comprising an outfeed conveyor illustrated in Figs. 1, 4 and 12, the details of same being described later. This article support means, though occupying a fixed position, is nevertheless permanently separated from said lower blade twisting member 94, by a blade transmitting gap 94c, see Fig. 4; extending all across the machine, thus leaving the slotted edge of member 94 entirely clear for the transmission of blades to their proper blade receiving slots in this member. Consequently, because of this blade transmitting gap 94c, and because of the general open position of blade twisting member 93, a continuous unobstructed passageway is provided from outside the machine, along which endless band blades may pass between the supporting frame and drums 31 and 32, thence unobstructedly to and along the edges of the upper and lower blade twisting members 93 and 94, into slots 93a and 94a, without necessity of separating or dismantling any parts which are normally fastened to the blade twisting guide members 93 and 94. The convenience which this organization provides, is a helpful improvement in installing blades in this type of slicer.

Turning now to the mechanism for supporting and feeding articles through the blades during slicing, I wish to emphasize that my invention can be successfully practiced with any desired form of feeding means, as many aspects of my invention are independent of the particular feeding means used; but nevertheless, and without in any way limiting myself, I wish to point out that some aspects of my invention have a particular relation or cooperation with reciprocating ram feeders of any suitable form. Therefore I have indicated in the drawings a preferred type of such ram feed mechanism, the same being fully illustrated and described in my Patent No. 2,106,969, dated February 1, 1938, entitled Bread slicer feed.

Certain details of this infeed mechanism are not fully shown in the present application, since they are not pertinent to the present invention. Enough of the infeed mechanism, however, is depicted in Figs. 1 and 2 to show clearly the path of the loaf in moving against and through the blades, and also to show the reciprocating ram that moves the loaf through the blades. In Fig. 1, a loaf in readiness to be moved against and through the blades is indicated in dotted lines at L, this loaf resting at the time on a reciprocating sustaining plate or member 160 having its upper surface roughly midway between drums 87 and 85 and in line with the upper surface of the aforementioned guide member 94, both plate 160 and said guide member 94 being inclined at a slight downward angle toward the blades. It is to be understood that the loaf L has been raised to the elevation shown by an elevator member, indicated fragmentarily at 161, and that after having been so elevated to the position of Fig. 1, plate 160 has been advanced to a position beneath the loaf. Elevator 161 is then in readiness to descend immediately to receive the loaf from a suitable infeed conveyor, not illustrated. A reciprocating ram 162, having the conventional ram fingers 162a adapted to move in between the blades, shown in Figs. 1 and 2, to be immediately back of loaf position L, next engages the loaf and propels it along a downwardly inclined path, parallel to the plate 160 on which the loaf is resting, to thus feed the loaf to, through and clear of the blades. This ram 162 is reciprocated by a linkage consisting of a link 163 pivotally connected to the rearward portion of the ram, a swinging arm 164 mounted on an oscillating shaft 165, the latter being operated by a swinging arm 166 moved by the forward end of a connecting rod 167, the rearward end of which is pivotally connected to a cross-head 168 (see Fig. 10) having a follower 169 operated by a cam groove 170 of a cam member 171 mounted on a main drive shaft 172. Drive shaft 172 may be driven in any suitable manner from any suitable power source, not shown, such power source usually being a primary shaft of an article wrapping machine with which the slicer is often synchronously connected. For a complete understanding of the indicated feed mechanism, reference is directed to my aforesaid Patent No. 2,106,949.

By reason of the downwardly inclined line of travel of the loaf in moving against and through the blades, the upper corner of the loaf is the first part to be presented to the blades. This method of moving the loaves against the blades is of advantage as compared with presenting the flat side of the loaf to the blades, in that a cleaner starting cut is made in the loaf and deformation of the loaf as the cut is started is minimized.

Attention is now directed to the fact that by using blade deflecting guide drums to bring the two courses of each blade relatively close together, it is possible to shorten the stroke of the reciprocating ram 162 needed to feed articles completely thru the blades, and by thus shortening the ram stroke the hourly slicing capacity of the machine can be increased without increasing the actual rate or velocity of feed through the blades. This mode of increasing the machine capacity is a feature of my invention. I wish further to point out that this feature is procured in maximum degree when the direction of ram feed is at right angles to the path of the slicing blades, in conformity with the diagrammatic modifications indicated in Figs. 14 and 15. In Figs. 14 and 15, parts corresponding to those shown in Figs. 1 and 2 are indicated by like reference numerals but with the letter "d" or "e" respectively added. All the ram actuating and guiding parts have not been duplicated in Figs. 14 and 15, because it is readily understood they are the same as those described and illustrated in connection with Fig. 1, and in my aforesaid patent. The right angle relation between the direction of ram feed and blade travel, can be procured either by actuating the ram in a horizontal path against substantially vertical blades, as indicated in Fig. 14, or by reciprocating the ram along an inclined path approximately as indicated in Fig. 1, and then tilting the entire blade drum supporting arrangement to cause the blades in the slicing zone to run substantially at right angles to this downwardly inclined ram path, as diagrammatically indicated in Fig. 15. For various reasons I often incline the ram path downwardly. One such reason is that structural requirements of endless band slicers tend to make them inherently tall, and the place of slicing relatively high, while the infeed conveyor of commercial wrapping machines to which the outfeed of my slicer is usually connected is relatively low, thereby requiring a steeply inclined outfeed conveyor on my slicer, which in turn calls for the previously mentioned downward inclination of the ram path. However, where these circumstances do not exist I prefer the horizontal direction of ram feed, at right angles to the vertical blade path, as indicated in Fig. 14; and in all cases where absolute maximum productive capacity of the machine is required, I prefer that the ram path be approximately at right angles to the blade path, either as in Fig. 14 or in Fig. 15. A variation of a few degrees from right angles, to insure that slicing starts at a corner of a loaf, instead of flatwise across the face of the loaf, I consider as lying within the term "approximately at right angles", as used in this application.

The bar or plate 94, with its forwardly projecting fingers defined by blade guide slots 94a, supports the loaves as they pass through the blades, this plate 94, as previously mentioned, being disposed in the same downwardly inclined plane as loaf supporting or sustaining plate 160 off which the loaf is moved by the reciprocating ram 162. From the forwardly projecting fingers of plate 94 the loaf moves onto a downwardly inclined outfeed support or conveyor, a preferred form of which is described in detail hereinafter.

Plate 94 is secured to and supported by a downwardly extending member 183 carried by a mounting 184 secured against a transversely extending plate 185, the ends of which are received in notches 186 formed in a pair of vertical supporting bars 187 and 188, being secured to said bars by means of screws 189. Bars 187 and 188 are spaced just within the sides of the machine and somewhat ahead of the cutting plane defined by the vertically moving blades. Bar 187 is mounted on frame member 23 by means of brackets 190 and 191, while bar 188, which reaches somewhat lower than bar 187, is mounted on posts 192 and 193 extending from frame casting 21 (see Fig. 2).

Above cross plate 185 is a second cross plate 195, the ends of which engage faces 196 of bars 187 and 188. This plate 195, however, is not stationarily secured to bars 187 and 188, but is vertically adjustable thereon. Thus plate 195 is provided with blocks 198 which fit between and slidably engage the inner faces 199 of bars 187 and 188, plate 195 being removably secured to blocks 198 as by means of screws 200.

Blocks 198 are screw threadedly mounted on vertical lead screws 202 supported by and adapted to turn in upper and lower bearings 203 and 204, respectively, mounted on the inner faces 199 of bars 187 and 188. The upper ends of these lead screws carry bevel gears 206 which mesh with bevel gears 207 mounted on a horizontal transverse shaft 208 which is journalled at its two ends in frame bars 187 and 188, being provided at its end adjacent the adjacent side door 19 with a hexagonal turning head or member 210 by means of which it may be rotated by a suitable wrench. Secured to the forward face of upper cross plate 195 is a pair of brackets 211 which carry a loaf hold-down plate 212. This hold-down plate 212, which is disposed at the same downward inclination as lower guide or loaf supporting plate 94, has secured to its upper side the previously described upper blade spacer bar or plate 93, i. e. the blade twisting guide means.

Figure 5:
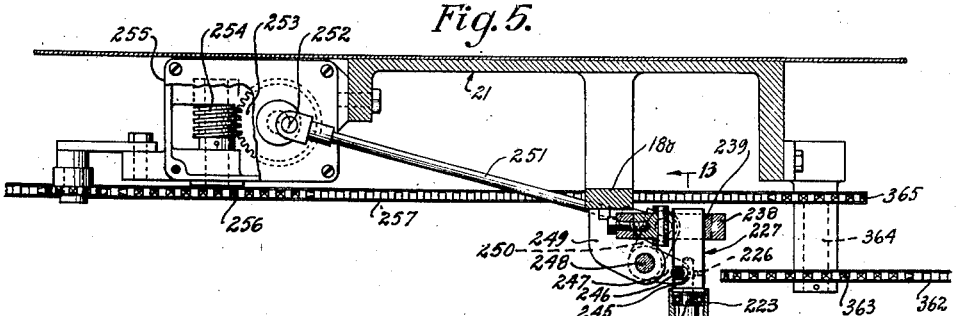
Fig. 5 is a view taken in the direction of arrows 5—5 of Fig 1.
Figure 6:
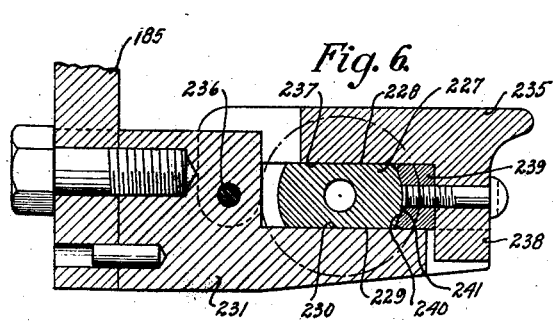
Fig. 6 is a detail taken as indicated by line 6—6 of Fig. 3.

Backing up the blade courses, just above and below the blade twisting guide bars 93 and 94, and extending transversely of the machine, I provide blade back-up means, preferably in the form of a pair of horizontal back-up rollers 220 and 221, respectively, said back-up means being adapted to support the rearward edges of the blades. Each of rollers 220 and 221 embodies a sleeve 222 rotatably mounted at each end on the outer race ring of a ball bearing 223 (see Fig. 5). Extending through sleeve 222 is a shaft 224, each end of which is provided with a reduced portion 225 on which the inner race ring of bearing 223 is mounted, and which extends beyond said bearing 223 and has mounted thereon, as by means of set screw 226, a slide member 227 having parallel, upper and lower flat surfaces 228 and 229. The surface 229 of slidable member 227 rests on a flat upwardly facing surface 230 formed on a mounting member 231 secured, in the case of the members corresponding to lower roller 221, to transverse cross plate 185, and in the case of the members corresponding to upper roller 220, to vertically adjustable mounting blocks 198. A keeper member 235 (see Fig. 6) is pivotally mounted at 236 on mounting member 231 and is adapted to be swung down with its flat downwardly facing surface 237 in relative sliding engagement with flat upper surface 228 of member 227. The outer end of keeper 235 has a depending portion 238 which overhangs member 227, and is provided with an abutment 239 having an arcuate surface 240 adapted to engage a complementary arcuate surface 241 on the edge of member 227, all as clearly illustrated in Fig. 6. It will be evident that lifting of keeper member 235 permits slide member 227 to be placed in or removed from the operative position illustrated. Some operators may find it convenient to remove rollers 220 and 221 temporarily when placing a new blade in the machine.

The blade back-up means, i. e. rollers 220 and 221, may be so positioned that when no article is being sliced, the rollers just barely touch the blades without deflecting the blades, or the rollers may touch and moderately deflect the blades, or preferably they may be set to just miss the rear edges of the blades leaving slight clearance therebetween. In the latter case, when a loaf or other article is passed through the blades, the blades are deflected rearwardly somewhat and engage these back-up rollers. By reason of the separation distance provided between drums 87 and 88 and between drums 85 and 86, the blade courses running in one direction between drums 87 and 86 engage lower back-up roller 221, while the blade courses traveling in the opposite direction between drums 85 and 88, i. e. individual drums 100, engage upper back-up roller 220. Each back-up roller is thus engaged only by blade courses traveling in one direction, and is therefore caused to rotate freely on its bearings, in the corresponding direction, without interference from the blade courses travelling in the other direction.

This rotation of the back-up rollers of course greatly reduces wear of the blades on the rollers. To still further reduce this wear, however, the rollers are slowly oscillated in an axial direction transversely of the blades during operation of the machine. To automatically effect this transverse movement of the blade back-up means, I supply some form of light power driven equipment, of which the following illustrates one type. Slide members 227 at the rearward side of the machine are each provided with a notch 245 (see Fig. 5), engaged by a long vertical pin 246 carried by crank arms 247 mounted on a vertical oscillating shaft 248, the latter being mounted in bearings 249 supported by bar 188. Mounted on the lower end of shaft 248 is an operating arm 250, connected by a link 251 to a crank pin 252, mounted on a worm wheel 253 driven by a worm 254, said gears being mounted in a suitable gear box 255 secured to frame casting 21. Worm 254 is driven by a sprocket 256 driven by a chain 257 which leads from a sprocket 258 on the previously mentioned main drive shaft 172, see Fig. 1. Thus rotation of sprocket 256 drives worm 254 and worm wheel 253, thereby operating through crank pin 252 to reciprocate link 251, and oscillate arm 250. This causes oscillation of shaft 248 and movement of arms 247 to cause longitudinal translation of slide members 227 and rollers 220 and 221 carried thereby. The arrangement is preferably such that the described longitudinal travel of back-up rollers 220 and 221 is very slow. These provisions, first, rotation of rollers 220 and 221, and second, endwise oscillation thereof, greatly increase the life of said rollers.

The sliced loaf is moved clear of the blades by ram 162, being received by the forward end of a downwardly inclined article support means or outfeed conveyor plate 350, the latter being formed of sheet metal and being provided along its longitudinal edges with downturned flanges 351. Of course, in many instances it may not be required that this outfeed conveyor plate have a downward inclination; the present machine is comparatively tall, however, and the outfeed conveyor is accordingly preferably given a downward inclination in order to feed the loaves out at a convenient elevation. Outfeed conveyor plate 350 is supported near its rearward end by shaft 342a passing through its flanges 351, said shaft being supported by a pair of brackets 342 mounted on the frame of the machine, as indicated in Fig. 1. At a point near the forward end of the outfeed conveyor plate, there is secured to flanges 351 mountings 343 carrying a transverse shaft 344 supported by the upper ends of arms 346 extending upwardly from horizontal frame members 347.

Secured to flanges 351 at the infeed end of conveyor plate 350 are a pair of bracket arms 352, and mounted for rotation in the ends of said arms is a transversely extending shaft 353. Similarly, there is secured to flanges 351 at the outfeed end of the conveyor plate a pair of arms 354 in which is journalled a transversely extending shaft 355.

Mounted on shafts 353 and 355 just outside flanges 351 are chain sprockets 360, and trained over these sprockets are a pair of conveyor chains 361. Shaft 355 is driven through a sprocket 360a, chain 362 and sprocket 363 from a shaft 364, on which is mounted a sprocket 365 driven by the previously mentioned chain 257 driven from main drive sprocket 258. Chains 361 are tensioned by idler sprockets 370 carried by swinging arms 371 pivotally mounted on flanges 351, as illustrated.

The size and position of sprockets 360 is such that chains 361 pass over conveyor plate 350 at an elevation just above the plane of its upper surface, and mounted on these chains is a series of spaced bread pusher slats 375, which are so spaced longitudinally of the chain as to engage and carry forwardly on conveyor plate 350 successive sliced loaves as they are received from the slicing blades. The sprockets involved in the drive of conveyor chains 361 are of such relative diameters, and the longitudinal spacing of slats 375 on chains 361 is such, that after a loaf has been moved through the slicing mechanism and onto the end of conveyor plate 350, a slat 375 on chains 361 comes upwardly around sprockets 360 at the beginning end of the conveyor plate and engages said loaf to move it along the conveyor plate, the timing being such that one slat is provided for each loaf received from the slicing blades.

The outfeed conveyor plate is preferably provided with side rails 380 adapted to engage and guide the ends of the sliced loaves as they are moved along the conveyor plate by slats 375. These rails are suspended from hangers 381 which are horizontally adjustable on horizontal cross bars 382 mounted at their ends on standards 383 secured to the side flanges 351 of the outfeed conveyor plate. Hangers 381 are adjustable horizontally on bar 382, being provided with hand screws 385 adapted to be set against bar 382 after adjustment. By this adjustment, the side rails are so positioned as to have just sufficient frictional engagement with the ends of the sliced loaves received from the blades to prevent them from sliding in confusion down the steeply inclined outfeed conveyor. This provision enables the loaves to be positively moved along and delivered from the outfeed conveyor by slats 375, at accurately timed intervals, thus preventing the loaves from falling ahead and piling up at the lower end of the outfeed conveyor, and permitting the outgoing end of the conveyor to be readily coupled to the infeed end of a wrapping machine, to synchronously deliver the loaves from the slicer conveyor to the wrapper mechanism in conformity with the requirements and timed operation of the latter. In applying this feature, I find it desirable to in some suitable manner provide a degree of transverse elasticity or resiliency in or about the side rails 380, so they can appropriately supply the desired friction or braking action against the ends of the loaves to prevent their sliding ahead in confusion as stated, and also to permit the side rails 380 to reasonably accommodate themselves transversely to moderate variations in loaf length. As a simple expedient for producing these results, I prefer to make the side rails 380 themselves of somewhat thin resilient material, and I also prefer to make the upright hangers 381, see Fig. 1, of such nature that they contribute somewhat to this resiliency. Greater resiliency can be procured in more complex ways, but the foregoing provision is reasonably adequate. This braking feature, supplied by the side rails, cooperates in a special sense with endless band blade slicers because the latter are inherently tall and often require considerable difference in elevation between the slicing zone and the point of final delivery, so that the pitch or inclination of the outfeed conveyor is often too great for normal operation of the simple slat type conveyor. For these reasons a mechanically more complex and less desired, lowerator mechanism would have to be substituted to the simple slat type conveyor, were it not for my having conceived the novel use of the side rails as brakes to retard the loaves against gravity, and thus make the loaves amenable to accurate timed delivery controlled by the pusher slats 375 with which the side rails thus cooperate frictionally.

Fig. 16 illustrates diagrammatically an uncrossed mode of mounting the blades on my six drum slicer, this corresponding broadly to the blade mounting illustrated in Fig. 11 of my aforesaid copending application Serial No. 112,539, filed November 24, 1936 now matured into Patent No. 2,143,242. However, in Fig. 16 of this present application, the two courses of each blade, although approximately parallel, and though brought relatively closer together by the blade deflecting guide drums 85f, 86f, 87f, and 88f, than they would be in the absence of these drums, are nevertheless not brought together to the maximum possible degree, i. e. they are not brought substantially into a common plane, as in Fig. 11 of my said copending application. It is apparent, in Fig. 16 of this present application, that although the benefits of my invention are realized in a moderate degree, such benefits would be realized in greater degree as the two courses of each blade are brought closer together by bringing the blade deflecting guide drums closer together, the maximum being attained when the blade deflecting guide drums bring all the courses of all the blades so close together that their cutting edges are all substantially parallel and substantially in a common plane. This observation is also applicable to the crossed blade arrangement illustrated in Figs. 1 and 17 of this application, and I prefer the crossed blade arrangement because the act of crossing the blades of itself brings the courses together, and gives them a natural twist in the desired direction.

In the uncrossed blade arrangement, instead of having only one upper and one lower blade back-up roller 220 and 221 respectively, there may be provided two oscillating upper blade back-up means or rollers 220f and 220f', and also two oscillating lower blade back-up means or rollers 221f and 221f'. The two rollers comprising each such group of upper and lower rollers in Fig. 16, can in obvious manner be associated to oscillate transversely and in unison with each other, by yoking them together at both ends by yoke members 220f" and 221f", which are simple expedients and need not be further illustrated or described. The mechanism for causing the transverse oscillation of the upper and lower groups of blade back-up rolls in Fig. 16, is substantially the same as the mechanism previously described for similarly oscillating the single blade back-up rolls of Fig. 1.

In the preferred form of my invention, either with crossed or uncrossed blades, I wish to point out that because all six drums 31, 32, 85, 86, 87 and 88 have their axes substantially parallel to each other, and because the axis of each such drum is substantially continuous in approximately the same straight line, and because the effective diameter of each such drum is substantially uniform all along, it follows that the group of corresponding blade courses that run in the one direction between the drums have all been guided and deflected substantially alike by the blade deflecting guide drums, so that all these blade courses in this group are in line with each other when viewed in a direction parallel to the axes of the blade supporting drums 31 and 32; and likewise the other group of corresponding blade courses that run in the other direction between the drums, have also been guided and deflected substantially alike by the blade deflecting guide drums so that all these blade courses in this group are also in line with each other when viewed in a direction parallel to the axes of said blade supporting drums. In a preferred form of my invention, where the two courses of each blade are brought moderately close to each other, the two aforesaid groups of blade courses are brought sufficiently close together so that the aforesaid line of each group may be said, roughly speaking, to substantially correspond with the line of the other group, or in other words, all the courses of substantially all the blades may be said to be brought substantially into a common line or plane.

The structure, advantages, operation and coaction of the various parts of my invention are now thought to be clear.

While I have hereinbefore illustrated and described the preferred form of my invention, and a few modifications thereof, I am aware that additional and extensive variations and modifications can be made therein without departing from the spirit of my invention. I, therefore, do not wish to be limited to the particular constructions or embodiments herein shown or described, but I desire to avail myself of all such variations and modifications as come within the scope of the following claims.

I claim:

1. In a slicing machine, the combination of a plurality of rotatable blade supporting drums spaced apart from each other, a plurality of endless band blades mounted side by side about said spaced apart blade supporting drums, blade twisting guide means contacting and twisting said blades into spaced parallel slicing planes, blade back-up means elongated to extend transversely of substantially all the blades and adapted to support the rearward edges of the blades, and power driven means for imparting a motion of translation to said blade back-up means lengthwise of said blade back-up means and transversely of the blades to reduce wear.

2. In a slicing machine, the combination of a plurality of rotatable blade supporting drums spaced apart from each other, a plurality of endless band blades mounted side by side about said spaced apart blade supporting drums, blade twisting guide means contacting and twisting said blades into spaced parallel slicing planes, a blade back-up roller means positioned on an axis extending transversely of the blades and adapted to support the rearward edges of the blades in the general neighborhood where they are twisted substantially into said spaced parallel slicing planes, and power driven means for moving said blade back-up roller means in a direction longitudinally of said axis and transversely of the blades to change the points of contact of the blades on said roller means to thereby distribute and reduce wear.

3. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting guide means spaced apart along said blade courses and contacting and twisting the said two courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, a plurality of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively close together, freely rotatable blade back-up rollers located in the vicinity of said slicing zone and adapted to support the rearward edges of said blade courses, and means rendered operative by the normal operation of the machine for continuously moving said blade back-up rollers back and forth in a direction approximately parallel to their respective axes to reduce wear on said rollers by said blades.

4. In a slicing machine, the combination of a plurality of endless band blades, mounting means for operatively mounting said endless band blades side by side transversely of the machine, said mounting means including a plurality of individually oscillatable blade tensioning assemblies mounted side by side transversely of the machine there being one such blade tensioning assembly for each of said endless band blades, stationary supporting means extending transversely of the machine for oscillatively supporting said plurality of blade tensioning assemblies, stationary reaction means extending transversely of the machine in the vicinity of said blade tensioning assemblies, each of said blade tensioning assemblies including an individual rotatable blade tensioning drum, a lever oscillatively mounted on said stationary transversely extending supporting means and rotatably carrying said individual blade tensioning drum, and means resiliently connecting said lever with said reaction means including a hook expedient and a spring, the said hook expedient being formed to permit quick disconnection of its lever from said stationary reaction means by moving said hook expedient in a direction approximately opposite to the direction of the normal reaction of said spring on the hook expedient.

5. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting guide means spaced apart along said blade courses and contacting and twisting the said two courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, a plurality of individually movable blade tensioning assemblies mounted side by side transversely of the machine there being one such blade tensioning assembly for each of said endless band blades and said blade tensioning assemblies contacting and tensioning said blades between said slicing zone and one of said blade supporting drums, a stationary supporting member extending transversely of the machine for movably supporting said plurality of blade tensioning assemblies, a stationary reaction member extending transversely of the machine in the vicinity of said blade tensioning assemblies and serving all of said blade tensioning assemblies in common, each of said blade tensioning assemblies including an individual rotatable blade tensioning drum, a lever movably mounted on the aforesaid stationary transversely extending supporting member and rotatably carrying its aforesaid individual blade tensioning drum, and means resiliently connecting its lever with said reaction member including a hook expedient and a spring, the said hook expedient being formed to permit quick disconnection of its lever from said stationary reaction member by manually moving said hook expedient in a direction approximately opposite to the direction of the reaction of said spring on its said hook expedient.

6. In a slicing machine, the combination of a plurality of endless band blades, mounting means for operatively mounting said endless band blades side by side transversely of the machine, said mounting means including a plurality of individually movable blade tensioning assemblies mounted side by side transversely of the machine there being one such blade tensioning assembly for each of said endless band blades, stationary supporting means extending transversely of the machine for movably supporting said plurality of blade tensioning assemblies, stationary reaction means extending transversely of the machine in the vicinity of said blade tensioning assemblies, each of said blade tensioning assemblies including an individual rotatable blade tensioning drum, a lever movably mounted on said stationary transversely extending supporting means and rotatably carrying its aforesaid individual blade tensioning drum, and means resiliently connecting its lever with said reaction means including a hook expedient and a spring, the said hook expedient of each said blade tensioning assembly being individually connectable to and disconnectable from said reaction means to tension and untension its said assembly without disturbing the connection between said reaction means and the said hook expedient of any of the other blade tensioning assemblies.

7. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting guide means spaced apart along said blade courses and contacting and twisting the said two courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, a plurality of individually movable blade tensioning assemblies mounted side by side transversely of the machine there being one such blade tensioning assembly for each of said endless band blades and said blade tensioning assemblies contacting and tensioning said blades between said slicing zone and one of said blade supporting drums, supporting means extending transversely of the machine for movably supporting said plurality of blade tensioning assemblies, reaction means in the vicinity of said blade tensioning assemblies, each of said blade tensioning assemblies including an individual rotatable blade tensioning drum, a lever movably mounted on the aforesaid supporting means and rotatably carrying its aforesaid individual blade tensioning drum, and means resiliently connecting its lever with said reaction means including a hook expedient, a spring and a screw-threaded adjustment for varying the reaction of said spring, the said hook expedient of each said blade tensioning assembly being individually connectible to and disconnectible from said reaction means to tension and untension its said assembly without disturbing the connection between said reaction means and the said hook expedient of any of the other blade tensioning assemblies.

8. In a slicing machine, the combination of upper and lower rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, upper and lower transversely extending blade twisting means spaced apart along said blade courses and contacting and twisting the said two courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, transversely extending article hold-down means mounted near the upper boundary of said slicing zone, said hold-down means and said upper blade twisting means being movable in unison upwardly and downwardly along a predetermined path, a plurality of upright adjusting screws rotatably mounted and spaced apart from each other, said hold-down means and said upper blade twisting means being adjustably supported by said spaced apart upright adjusting screws, and means operatively connected with all of said upright screws to turn them in unison to thereby adjust said hold-down means and said upper blade twisting means in unison upwardly and downwardly, the said spaced apart screws holding the transverse directions of said hold-down means and said upper blade twisting means parallel in all such adjusted positions.

9. In a slicing machine, the combination of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting means spaced apart along said blade courses and having therein a plurality of spaced blade twisting slots, each of said blade courses running in one such slot in each of said spaced apart blade twisting means, and the sides of said slots twisting the courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone and within which slicing zone the blade courses that cut on opposite sides of the same slice run in opposite directions, each of said blade twisting means having therein a greater number of said blade twisting slots than there are blade courses to be twisted thereby, and the two courses of most of said blades being arranged in said slots at equal spacing from each other but the two courses of one or more of said blades being arranged with a larger spacing between them by use of said surplus blade twisting slots, and yieldable blade tensioning means for the blades adapted to yield to accommodate said larger spacing between the two courses of some of the blades.

10. In a slicing machine, the combination of a plurality of endless band blades, rotatable mounting means on and about which said endless band blades are operatively mounted side by side transversely of the machine, said mounting means including a plurality of individually movable self-actuating blade tensioning assemblies mounted side by side transversely of the machine, there being one such blade tensioning assembly for each of said endless band blades and each such assembly including as a part thereof a rotatable drum continually tensioning its endless band blade, a shaft mounted transversely of said machine, said blade tensioning assemblies being oscillatively mounted on said shaft and being free to move along said shaft transversely of said machine, supporting means extending transversely of said machine and spaced means supported by and extending from said supporting means into contact with said blade tensioning assemblies to space said blade tensioning assemblies from each other in a predetermined manner transversely of the machine.

11. In a slicing machine, the combination of a plurality of endless band blades, rotatable mounting means on and about which said endless band blades are operatively mounted side by side transversely of the machine, said mounting means including a plurality of individually movable self-actuating blade tensioning assemblies mounted side by side transversely of the machine, there being one such blade tensioning assembly for each of said endless band blades and each such assembly including as a part thereof a rotatable drum continually tensioning its endless band blade, a shaft mounted transversely of said machine, said blade tensioning assemblies being oscillatively mounted on said shaft and being free to move along said shaft transversely of said machine, end stops securely but adjustably fastened to said shaft for limiting the transverse movement of said blade tensioning assemblies along said shaft, a member extending transversely of said machine and spacing fingers projecting therefrom into the space between said blade tensioning assemblies to space said blade tensioning assemblies apart uniformly in the space between said end stops.

12. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, and each of said blades being so mounted about said spaced apart blade supporting drums that each of said two courses of each blade crosses from one side of one of the blade supporting drums to the opposite side of the other of the blade supporting drums about which the blade is mounted to thereby cause the cutting edges of said two courses of each blade to cross each other, blade twisting means spaced apart along said blade courses and contacting and twisting the said two courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, freely rotatable blade back-up rollers located in the vicinity of said slicing zone and adapted to support the rearward edges of said blade courses, and power driven means operable during the normal operation of the machine for moving said blade back-up rollers back and forth in a direction approximately parallel to their respective axes to reduce wear on said rollers by said blades.

13. In a band blade slicing machine, the combination of two pairs of band blade guide drums, said pairs being spaced apart to provide a slicing zone therebetween, all of said drums being rotatable on approximately parallel axes, and the two drums of both said pairs of drums being wholly disposed on opposite sides of a common plane and being spaced from one another for band blade passage therebetween, a plurality of endless band blades arranged side by side between the drums of each such pair and extending across the space between said pairs of drums, each of said endless band blades being arranged to provide two crossing blade courses extending between said pairs of drums and an end loop outside each of said pairs of drums, one course of each of said blades contacting and extending between the inner side of the drum of one pair which is on one side of said plane and the inner side of the drum of the other pair which is on the opposite side of said plane, and the other course of each of said blades contacting and extending between the inner side of the other drum of the first mentioned pair and the inner side of the other drum of the second mentioned pair, corresponding courses of all of said endless band blades being in approximate alinement when viewed in a direction parallel to the axes of said drums, each course of each of said blades being twisted through 180° between the two said drums which it contacts, rotatable drum means disposed beyond each of said pairs of guide drums and inside of and supporting said end loops of said band blades, and spaced-apart blade twisting guide means located approximately midway between said pairs of guide drums near the point at which the two courses of each band blade cross one another and serving to twist the two courses of substantially all said blades into spaced parallel slicing planes, said spaced-apart blade twisting means being spaced sufficiently apart to permit the articles to be sliced to pass therebetween.

14. In a band blade slicing machine, the combination of two pairs of band blade guide drums, said pairs being spaced apart to provide a slicing zone therebetween, all of said drums being rotatable on approximately parallel axes, and the two drums of both said pairs of drums being wholly disposed on opposite sides of a common plane and being spaced from one another for band blade passage therebetween, a plurality of endless band blades arranged side by side between the drums of each such pair and extending across the space between said pairs of drums, each of said endless band blades being arranged to provide two crossing blade courses extending between said pairs of drums and an end loop outside each of said pairs of drums, one course of each of said blades contacting and extending between the inner side of the drum of one pair which is on one side of said plane and the inner side of the drum of the other pair which is on the opposite side of said plane, and the other course of each of said blades contacting and extending between the inner side of the other drum of the first mentioned pair and the inner side of the other drum of the second mentioned pair, corresponding courses of all of said endless band blades being in approximate alinement when viewed in a direction parallel to the axes of said drums, each course of each of said blades being twisted through 180° between the two said drums which it contacts, rotatable drum means disposed beyond each of said pairs of guide drums and inside of and supporting said end loops of said band blades, and spaced-apart blade twisting guide means located on opposite sides of the point at which said blade courses cross one another and serving to twist the two courses of substantially all said blades into spaced parallel slicing planes, said spaced-apart blade twisting means being spaced sufficiently apart to permit the article to be sliced to pass therebetween.

15. In a band blade slicing machine, the combination of two pairs of band blade guide drums, said pairs being spaced apart to provide a slicing zone therebetween, all of said drums being rotatable on approximately parallel axes, and the two drums of both said pairs of drums being wholly disposed on opposite sides of a common plane and being spaced from one another for band blade passage therebetween, a plurality of endless band blades arranged side by side between the drums of each such pair and extending across the space between said pairs of drums, each of said endless band blades being arranged to provide two crossing blade courses extending between said pairs of drums and an end loop outside each of said pairs of drums, one course of each of said blades contacting and extending between the inner side of the drum of one pair which is on one side of said plane and the inner side of the drum of the other pair which is on the opposite side of said plane, and the other course of each of said blades contacting and extending between the inner side of the other drum of the first mentioned pair and the inner side of the other drum of the second mentioned pair, corresponding courses of all of said endless band blades being in approximate alinement when viewed in a direction parallel to the axes of said drums, each course of each of said blades being twisted through 180° between the two said drums which it contacts, rotatable blade supporting drums disposed beyond each of said pairs of drums and contacting and supporting the inner sides of said end loops of said band blades, the axes of said blade supporting drums being approximately parallel to the axes of said band blade guide drums and being located near said plane that extends between the individual members of said two pairs of guide drums, and spaced-apart blade twisting guide means located on opposite sides of the point at which said blade courses cross one another and serving to twist the two courses of substantially all said blades into spaced parallel slicing planes, said spaced-apart blade twisting means being spaced sufficiently apart to permit the article to be sliced to pass therebetween.

16. In a band blade slicing machine, the combination of rotatable band blade drums spaced from one another and rotatable on substantially parallel axes, a plurality of endless band blades arranged side by side about said drums, each of said endless band blades engaging and running about each of said drums and providing two blade courses running in opposite directions between said drums, each of the two courses of each of said blades contacting opposite sides of said spaced drums to thereby cross one another between said drums, with each of said blade courses making a 180° twist between said drums, a plurality of blade guide drums grouped adjacent each of said first mentioned drums and positioned to contact the remote or outer sides of the two crossing courses of each of the blades and to deflect the two courses of the blades sufficiently toward one another to position their cutting edges in relatively close proximity to a common plane, and spaced blade twisting guide means located on opposite sides of the point at which said blade courses cross one another, said blade twisting guide means twisting the two courses of the blades into spaced parallel slicing planes, and being spaced apart a distance sufficient for the article to be sliced to pass therebetween.

17. In a band blade slicing machine, the combination of rotatable band blade drums spaced from one another and rotatable on substantially parallel axes, a plurality of endless band blades arranged side by side about said drums, each of said endless band blades engaging and running about each of said drums and providing two blade courses running in opposite directions between said drums, each of the two courses of each of said blades contacting opposite sides of said spaced drums to thereby cross one another between said drums, with each of said blade courses making a 180° twist between said drums, a plurality of blade guide drums grouped adjacent each of said first mentioned drums and positioned to contact the remote or outer sides of the two crossing courses of each of the blades near each of said first mentioned drums and to support the two courses of the blades at an angle of divergence of no greater than substantially 10°, and spaced blade twisting guide means located on opposite sides of the point at which said blade courses cross one another, said blade twisting guide means twisting the two courses of the blades into spaced parallel slicing planes, and being spaced apart a distance sufficient for the article to be sliced to pass therebetween.

18. In a band blade slicing machine, the combination of rotatable band blade drums spaced from one another and rotatable on substantially parallel axes, a plurality of endless band blades arranged side by side about said drums, each of said endless band blades engaging and running about each of said drums and providing two blade courses running in opposite directions between said drums, each of the two courses of each of said blades contacting opposite sides of said spaced drums to thereby cross one another between said drums, with each of said blade courses making a 180° twist between said drums, a pair of blade guide drums grouped near each of said first mentioned drums and between said first mentioned drums, the two blade guide drums of each said pair being spaced apart but close to each other and respectively contacting the outer sides of the crossed blade courses travelling in opposite directions between the first mentioned drums, and the two guide drums that contact one course of each blade being so located with relation to the two guide drums that contact the other course of said blade that the 90° points of said 180° twists of the two courses of each of the blades occur approximately at the point where said blade courses cross one another, and spaced-apart blade twisting means located in close proximity to said point at which said blade courses cross one another, said blade twisting guide means twisting the two courses of the blades into spaced parallel slicing planes, and being spaced apart a distance sufficient for the article to be sliced to pass therebetween.

19. In a band blade slicing machine, the combination of rotatable band blade drums spaced from one another and rotatable on substantially parallel axes, a plurality of endless band blades arranged side by side about said drums, each of said endless band blades engaging and running about each of said drums and providing two blade courses running in opposite directions between said drums, each of the two courses of each of said blades contacting opposite sides of said spaced drums to thereby cross one another between said drums, with each of said blade courses making a 180° twist between said drums, a pair of blade guide drums grouped near each of said first mentioned drums and between said first mentioned drums, the two blade guide drums of each such pair being spaced apart and contacting respectively the outer sides of the crossed blade courses travelling in opposite directions between the first mentioned drums, and the two guide drums that contact one course of each blade being so located with relation to the two guide drums that contact the other course of said blade that the 90° points of said 180° twists of the two courses of each of the blades occur approximately at the point where said blade courses cross one another, and spaced-apart blade twisting means located on opposite sides of said point at which said blade courses cross one another, said blade twisting guide means twisting the two courses of the blades into spaced parallel slicing planes, and being spaced apart a distance sufficient for the article to be sliced to pass therebetween.

20. In a slicing machine, the combination of upper and lower rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, upper and lower transversely extending blade twisting means spaced apart along said blade courses and contacting and twisting the said two courses of substantially all said blades into spaced parallel slicing planes, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, transversely extending article hold-down means mounted near the upper boundary of said slicing zone, transversely extending blade back-up means for supporting the rear edge of the blades and located near the upper boundary of said slicing zone, said hold-down means together with said blade back-up means and said upper blade-twisting means being joined together to be movable in unison upwardly and downwardly along a predetermined path, a plurality of upright adjusting screws rotatably mounted and spaced apart from each other, said hold-down means together with said blade back-up means and said upper blade twisting means being adjustably supported by said spaced apart upright adjusting screws, and means operatively connected with all of said upright screws to turn them in unison to thereby adjust said hold-down means together with said blade back-up means and said upper blade-twisting means in unison upwardly and downwardly, the said spaced apart screws holding the transverse directions of said hold-down means, said blade back-up means and said upper blade-twisting means substantially parallel in all such adjusted positions.

WILLIAM WALTER HARTMAN.